United States Patent
Lin et al.

(10) Patent No.: US 8,305,047 B2
(45) Date of Patent: Nov. 6, 2012

(54) SAFETY CAPACITOR DISCHARGING METHOD AND APPARATUS FOR AC-TO-DC CONVERTERS

(75) Inventors: Chun-Liang Lin, Hsin-Chu (TW); Chi-Hao Wu, Hsin-Chu (TW); Ko-Ming Lin, Hsin-Chu (TW); Huang-Chi Lin, Hsin-Chu (TW); Chang-Ling Sha, Hsin-Chu (TW); Jun-Shiung Huang, Hsin-Chu (TW)

(73) Assignee: Grenergy Opto, Inc., Hsin-Chu (TW)

( * ) Notice: Subject to any disclaimer, the term of this patent is extended or adjusted under 35 U.S.C. 154(b) by 661 days.

(21) Appl. No.: 12/566,268

(22) Filed: Sep. 24, 2009

(65) Prior Publication Data
US 2011/0068751 A1 Mar. 24, 2011

(51) Int. Cl.
*H02J 7/00* (2006.01)
(52) U.S. Cl. .......... 320/166; 320/167
(58) Field of Classification Search ........ 320/166, 320/167; 307/109; 361/117; 363/59
See application file for complete search history.

(56) References Cited

U.S. PATENT DOCUMENTS

| 5,523,665 A * | 6/1996 | Deaver .......... 320/166 |
| 6,906,934 B2 * | 6/2005 | Yang et al. .......... 363/49 |
| 2005/0151524 A1 * | 7/2005 | Sae-Ueng et al. .......... 323/282 |
| 2005/0275384 A1 * | 12/2005 | Ichimasa .......... 320/166 |
| 2009/0195221 A1 * | 8/2009 | Pai et al. .......... 320/166 |

* cited by examiner

*Primary Examiner* — Jay Patidar
(74) *Attorney, Agent, or Firm* — Muncy, Geissler, Olds & Lowe, PLLC

(57) ABSTRACT

The present invention discloses a safety capacitor discharging method for AC-to-DC converters, wherein the AC-to-DC converters have a safety capacitor connected between two line voltages, the method comprising the steps of: detecting at least one line voltage to generate a line-off signal, wherein the line-off signal is at a first state when the peak voltage of the at least one line voltage is above a reference voltage, and the line-off signal is at a second state when the peak voltage of the at least one line voltage is below the reference voltage; and performing discharge of the safety capacitor by generating a conduction path between two plates of the safety capacitor when the line-off signal is at the second state. The present invention also provides a safety capacitor discharging apparatus for AC-to-DC converters.

6 Claims, 11 Drawing Sheets

SAFETY CAPACITOR DISCHARGING METHOD AND APPARATUS FOR AC-TO-DC CONVERTERS

BACKGROUND OF THE INVENTION

1. Field of the Invention

The present invention relates to AC to DC converters, and more particularly relates to AC to DC converters with a safety capacitor discharging apparatus.

2. Description of the Related Art

In supplying the power for electronic equipments, switching power converters are widely adopted due to the advantages of high conversion efficiency and small component size they possess.

Taking the fly-back AC-to-DC power adapter as an example, FIG. 1 shows the circuit diagram of a typical fly-back AC-to-DC power adapter. As shown in FIG. 1, the typical fly-back AC-to-DC power adapter includes a safety capacitor 101, a bleed resistor 102, an input rectification and filtering unit 103, a primary side voltage clamping snubber 104, a main transformer 105, an output rectification and filtering unit 106, a feedback network 107, an NMOS transistor 108, a resistor 109, a PWM IC 110, an auxiliary coil 111 and an auxiliary rectification and filtering unit 112.

First of all, the safety capacitor 101 is connected between two line voltages to filter out the EMI noise, and the bleed resistor 102 is used to discharge the safety capacitor 101 when the AC power is plugged off, to prevent the user from getting electric shock.

The functions of the rest parts of the adapter are briefly stated below: the input rectification and filtering unit 103 is used to generate a main input voltage $V_{IN}$ according to the AC power; the primary side voltage clamping snubber 104 is used to clamp the maximum primary side voltage of the main transformer 105 when the NMOS transistor 108 is off; the main transformer 105, having a primary side coupled to the main input voltage $V_{IN}$ and a secondary side coupled to the output rectification and filtering unit 106, is used to convert power from the AC power to the DC output $V_{out}$ of the adapter; the output rectification and filtering unit 106 is used to generate a DC output voltage $V_{out}$; the feedback network 107 is used to generate a feedback signal $V_{FB}$, which is coupled to the COMP pin of the PWM IC 110, according to an error signal derived from a reference voltage and the DC output voltage $V_{out}$; the NMOS transistor 108, responsive to a gating signal $V_G$, is used to control the power conversion via the main transformer 105; the resistor 109 is used to carry a current sensing signal $V_{CS}$; the PWM IC 110 is used to generate the gating signal $V_G$ according to the feedback signal $V_{FB}$ and the current sensing signal $V_{CS}$ to regulate the DC output voltage $V_{out}$ at an expected level; the auxiliary coil 111 and the auxiliary rectification and filtering unit 112 are used to generate a DC supply voltage $V_{CC}$ for the operation of the PWM IC 110.

With the AC power plugged in, the input power is transformed through the main transformer 105 to the output through a periodic on-and-off switching of the NMOS transistor 108, which is driven by the gating signal $V_G$ generated from the PWM IC 110. Once the AC power is plugged off, the PWM IC 110 will stop operating after the DC supply voltage $V_{CC}$ falls below a threshold voltage, and if the adapter is under light load or empty load, the safety capacitor 101 will see only one discharging load—the bleed resistor 102—due to the fact that the main input voltage $V_{IN}$ at the common cathode contact of the right pair of diodes of the bridge rectifier in the input rectification and filtering unit 103 is held on the bulk capacitor in the input rectification and filtering unit 103 so it will reversely bias the right pair of diodes of the bridge rectifier and thereby shut off the conduction path to the right. According to the safety regulation for protecting users from electric shock, the charge on the safety capacitor 101 should be decreased to 37% of its original maximum value in 1 second after the AC power is plugged off. To meet this safety regulation, if the capacitance of the safety capacitor 101 is set at, for example 0.82 F, the resistance of the bleed resistor 102 will have to be restricted under 1MΩ. However, the bleed resistor 102 under this resistance restriction will consume considerable power which is likely to fail to comply with the green regulation of the adapter in standby mode, for example less 100 mW. On the other hand, if we increase the resistance of the bleed resistor 102 to reduce the power dissipation, the discharge process of the safety capacitor 101 will be prolonged and the safety regulation will be violated.

Therefore, there is a need to provide a solution capable of obeying both the safety regulation and the green regulation for AC-to-DC converters. Seeing this bottleneck, the present invention proposes a novel adapter topology with a discharging scheme to accomplish both the safety and the green requirements.

SUMMARY OF THE INVENTION

One objective of the present invention is to provide a safety capacitor discharging method for AC-to-DC converters to comply with the safety regulation and minimize the standby power consumption.

Another objective of the present invention is to further provide a safety capacitor discharging apparatus for AC-to-DC converters to comply with the safety regulation and minimize the standby power consumption.

To achieve the foregoing objectives of the present invention, a safety capacitor discharging method for AC-to-DC converters is proposed, wherein the AC-to-DC converters have a safety capacitor connected between two line voltages, the method comprising the steps of detecting at least one line voltage to generate a line-off signal, wherein the line-off signal is at a first state when the peak voltage of the at least one line voltage is above a reference voltage, and the line-off signal is at a second state when the peak voltage of the at least one line voltage is below the reference voltage; and performing discharge of the safety capacitor by generating a conduction path between two plates of the safety capacitor when the line-off signal is at the second state.

To achieve the foregoing objectives, the present invention further provides a safety capacitor discharging apparatus for AC-to-DC converters, wherein the AC-to-DC converters have a safety capacitor connected between two line voltages, the apparatus comprising: a line detector, used for detecting at least one line voltage to generate a line-off signal, wherein the line-off signal is at a first state when the peak voltage of the at least one line voltage is above a reference voltage, and the line-off signal is at a second state when the peak voltage of the at least one line voltage is below the reference voltage; and a discharging circuit, used for discharging the safety capacitor by generating a conduction path between two plates of the safety capacitor when the line-off signal is at the second state.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
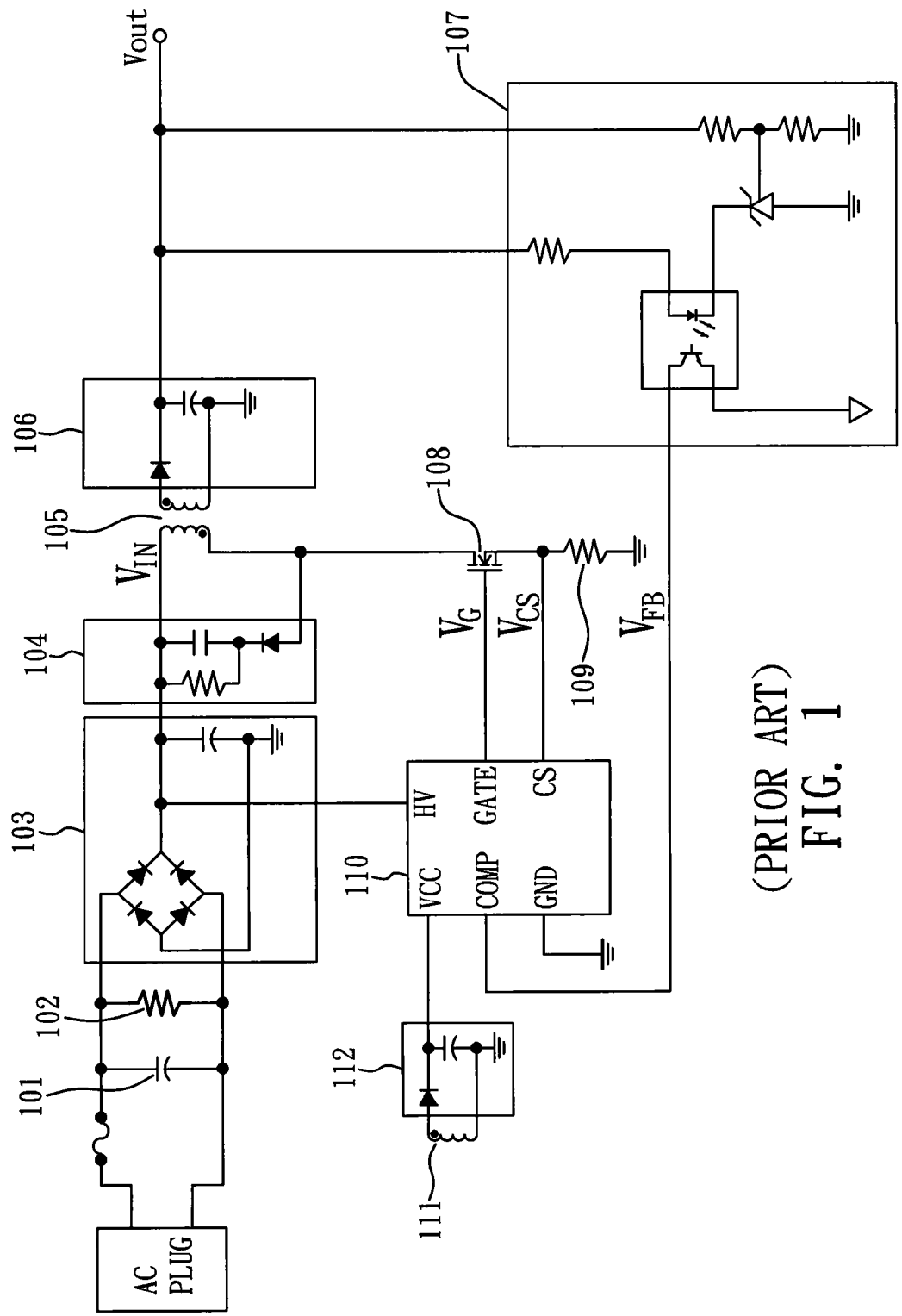
FIG. 1 is the circuit diagram of a prior art fly-back AC-to-DC power adapter comprising a safety capacitor and a bleed resistor.
Figure 2:
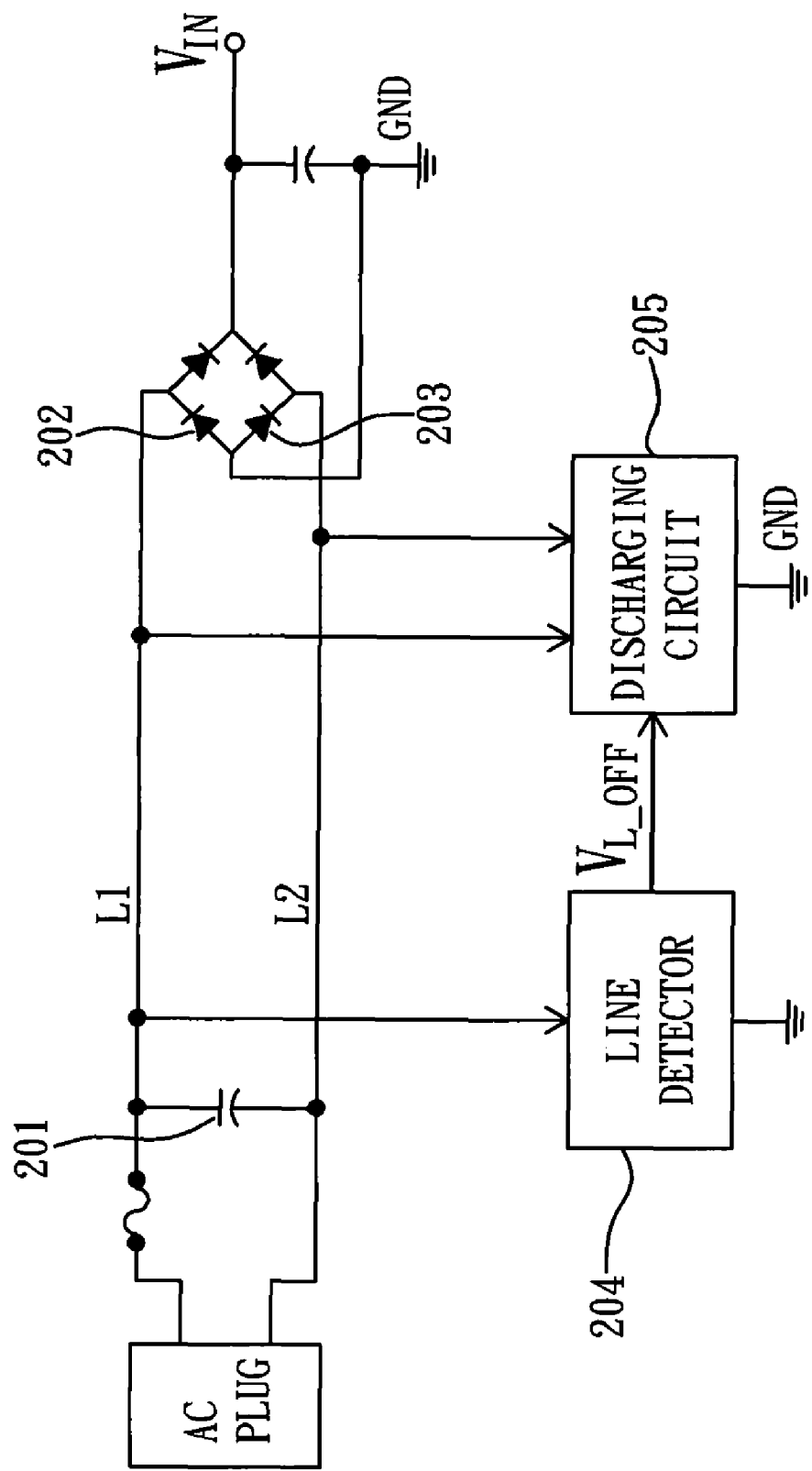
FIG. 2 is the block diagram of a front end part of an AC-to-DC power application comprising a safety capacitor discharging apparatus according to a preferred embodiment of the present invention.

Please refer to FIG. 2, which shows the block diagram of a front end part of an AC-to-DC power application comprising a safety capacitor discharging apparatus according to a preferred embodiment of the present invention. As shown in FIG. 2, the front end part includes a safety capacitor 201, diodes 202~203, a line detector 204 and a discharging circuit 205.

In the front end part, the safety capacitor 201 is used to absorb the EMI noise from between AC power lines L1, L2. The diode 202 and the diode 203 are used as unilateral switches acting in a way that when the voltage on L1 is negative and the voltage on L2 is positive, the diode 202 will be conducted and the diode 203 will be off, and when the voltage on L1 is positive and the voltage on L2 is negative, the diode 202 will be off and the diode 203 will be conducted, wherein the voltage on L1 or L2 is taken relative to a reference ground GND in FIG. 2.

The line detector 204 and the discharging circuit 205 are used to implement a safety capacitor discharging apparatus, wherein the line detector 204 is coupled to L1 or L2 to generate a line-off signal $V_{L\_OFF}$ (although it is L1 in FIG. 2), and the discharging circuit 205, coupled to two plates of the safety capacitor 201, is controlled by the line-off signal $V_{L\_OFF}$ to form a discharging load between the two plates of the safety capacitor 201. Once the AC power is plugged off, the voltage on L1 or L2 will decrease rapidly; when the peak voltage on L1 or L2 falls below a reference voltage, the line-off signal $V_{L\_OFF}$ will change from a first state (for example a low level) to a second state (for example a high level), and there will be a discharging path formed between the two plates of the safety capacitor 201.

The discharging path can be one of the following types: first type, including the reference ground GND, having two current directions: L1→the discharging circuit 205→GND→diode 203 (or the discharging circuit 205)→L2 with (voltage on L1, voltage on L2) being (positive, negative), and L2→the discharging circuit 205→GND→diode 202(or the discharging circuit 205)→L1 with (voltage on L1, voltage on L2) being (negative, positive); second type, not including the reference ground GND, having two current directions: L1→the discharging circuit 205→L2 with (voltage on L1, voltage on L2) being (positive, negative), and L2→the discharging circuit 205→L1 with (voltage on L1, voltage on L2) being (negative, positive); and third type, being a combination of the first type and the second type.

Figure 3:
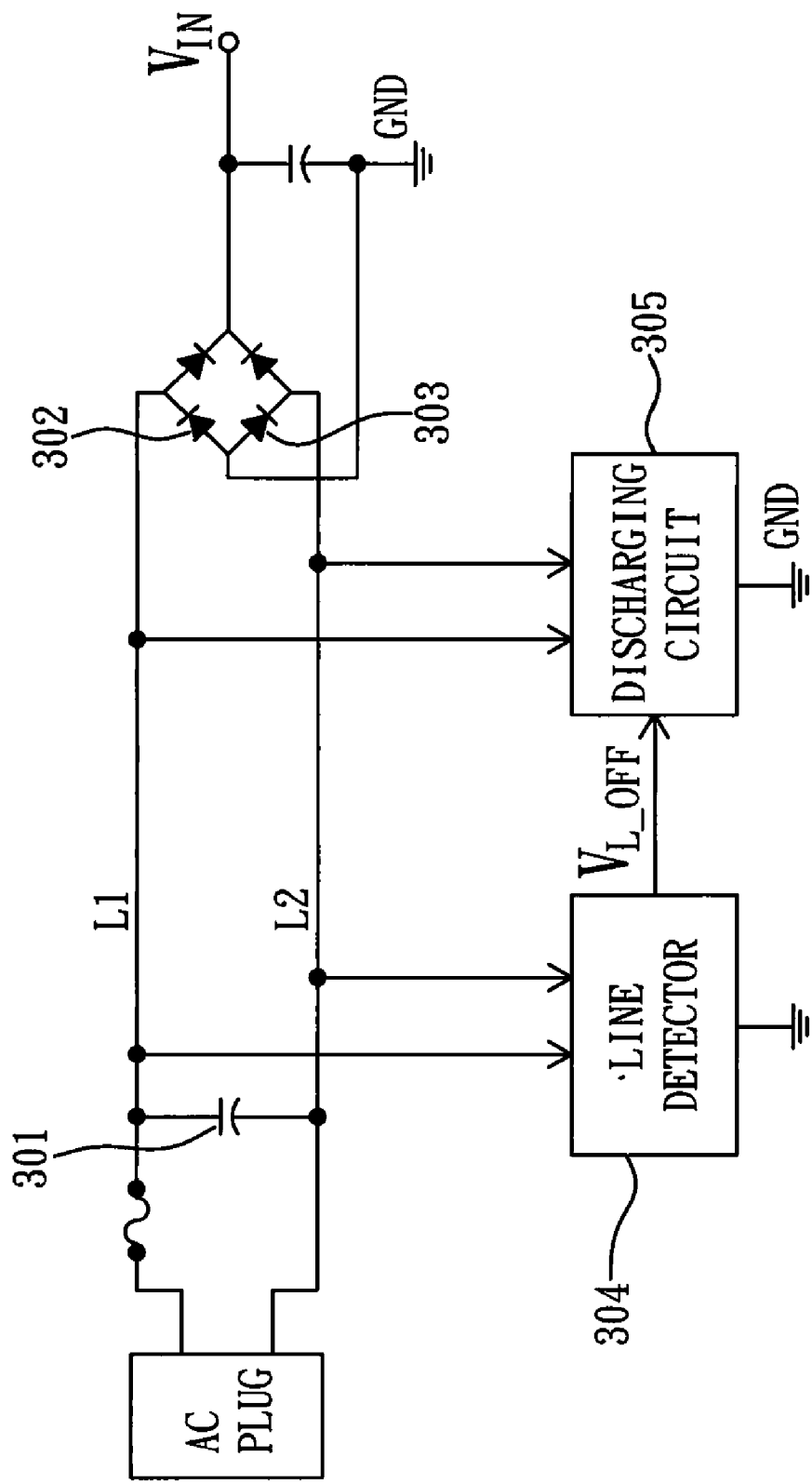
FIG. 3 is the block diagram of a front end part of an AC-to-DC power application comprising a safety capacitor discharging apparatus according to another preferred embodiment of the present invention.

FIG. 3 shows the block diagram of a front end part of an AC-to-DC power application comprising a safety capacitor discharging apparatus according to another preferred embodiment of the present invention. As shown in FIG. 3, the front end part includes a safety capacitor 301, diodes 302~303, a line detector 304 and a discharging circuit 305.

As the counter part in FIG. 2, the safety capacitor 301 is used to absorb the EMI noise from between AC power lines L1, L2, and the diode 302 and the diode 303 are used as unilateral switches acting in a way that when the voltage on L1 is negative and the voltage on L2 is positive, the diode 302 will be conducted and the diode 303 will be off, and when the voltage on L1 is positive and the voltage on L2 is negative, the diode 302 will be off and the diode 303 will be conducted.

The line detector 304 and the discharging circuit 305 are used to implement a safety capacitor discharging apparatus, wherein the line detector 304 is coupled to L1 and L2 to generate a line-off signal $V_{L\_OFF}$, and the discharging circuit 305, coupled to two plates of the safety capacitor 301, is controlled by the line-off signal $V_{L\_OFF}$ to form a discharging load between the two plates of the safety capacitor 301. Once the AC power is plugged off, the voltages on L1 and L2 will decrease rapidly; when the higher one of the peak voltages on L1 and L2 falls below a reference voltage, the line-off signal $V_{L\_OFF}$ will change from a first state (for example a low level) to a second state (for example a high level), and there will be a discharging path formed between the two plates of the safety capacitor 301.

The discharging path formed in FIG. 3 is the same as that in FIG. 2 mentioned above, so it will not be addressed here.

Figure 4A:
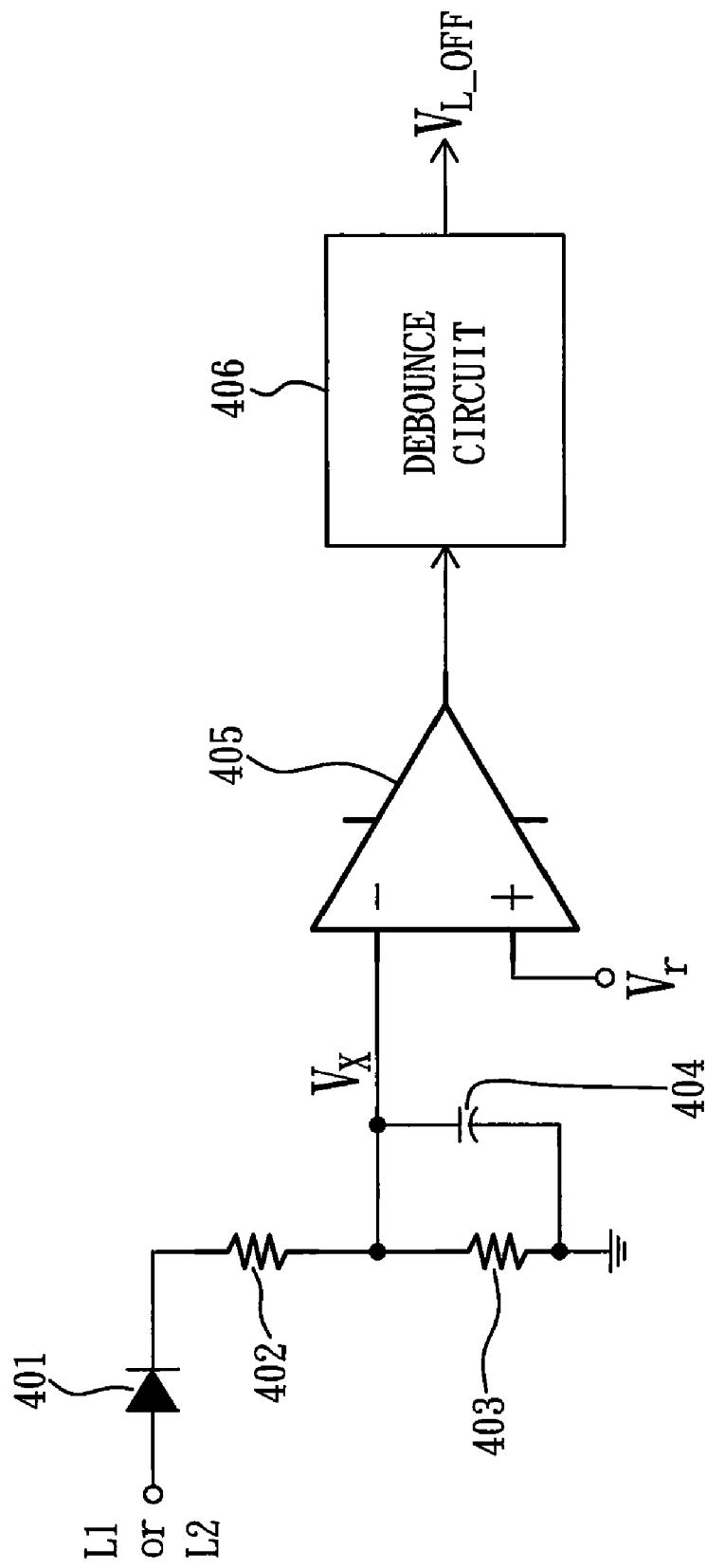
FIG. 4a is the circuit diagram of a line detector according to a preferred embodiment of the present invention.

Please refer to FIG. 4a, which shows the circuit diagram of a line detector according to a preferred embodiment of the present invention. As shown in FIG. 4a, the line detector includes a diode 401, resistors 402~403, a capacitor 404, a comparator 405 and a debounce circuit 406.

The diode 401, the resistors 402~403 and the capacitor 404 are used as a peak voltage detector to generate a peak voltage $V_X$ according to L1 or L2, and the formula can be derived with reference to FIG. 4a as follows:

$V_X$=(voltage on L1 or L2−forward voltage of the diode 401)×resistance of the resistor 403/(resistance of the resistor 402+resistance of the resistor 403). For occasions that components reduction is under consideration, the diode 401 can be replaced with short circuit, and the formula will be: $V_X$=(voltage on L1 or L2)×resistance of the resistor 403/(resistance of the resistor 402+resistance of the resistor 403). Once the AC power is plugged off, the peak voltage $V_X$ will be decreasing over time, and when $V_X$ falls below a reference voltage $V_r$, the output of the comparator 405 will change state from a low level to a high level. Since the resistors 402~403 will contribute an added power consumption to the adapter, large resistances therefore should be used to minimize the added power consumption. The debounce circuit 406 is coupled to the output of the comparator 405 for filtering out possible transient glitches to generate the line-off signal $V_{L\_OFF}$. As the debounce circuit 406 can be implemented with any conventional one like debounce timer of which the circuit is available in regular digital electronic circuits textbooks, its detailed circuit is not drafted here.

Figure 4B:
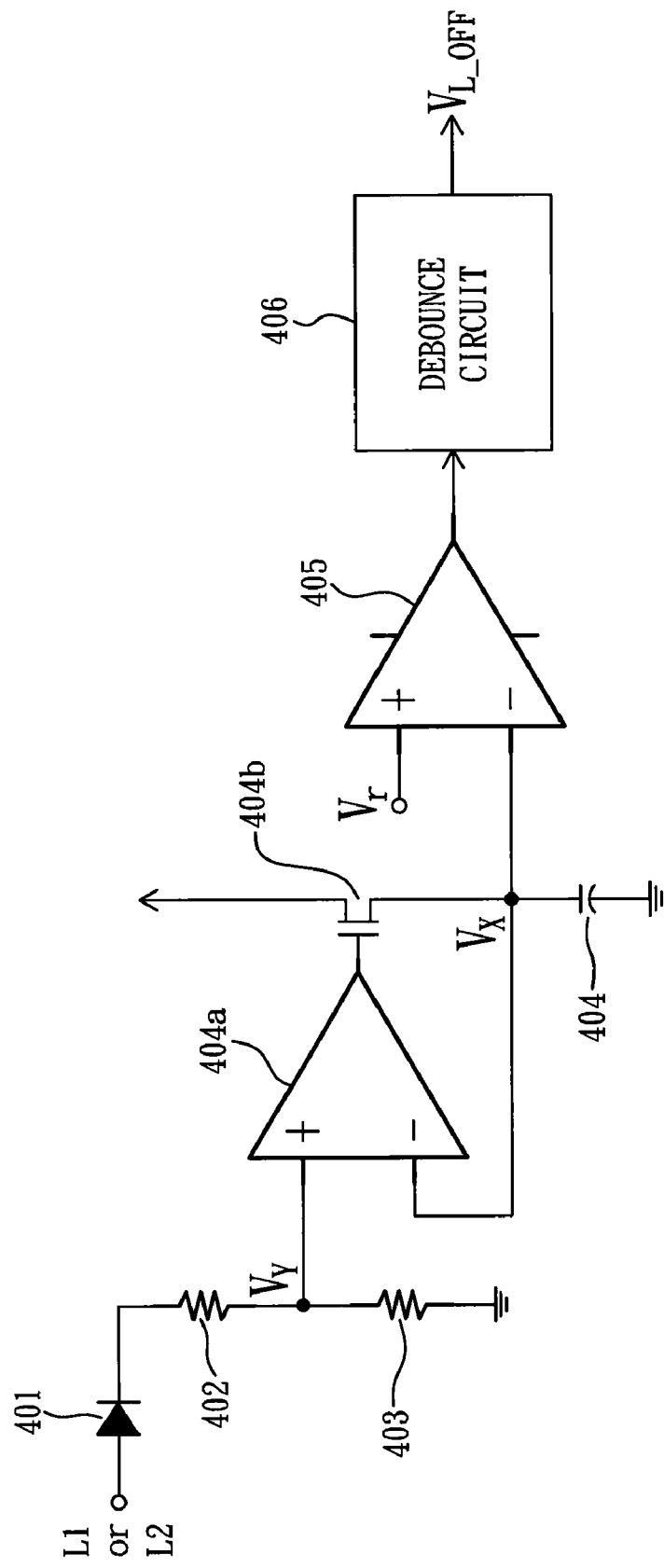
FIG. 4b is the circuit diagram of a line detector according to another preferred embodiment of the present invention.

Please refer to FIG. 4b, which shows the circuit diagram of a line detector according to another preferred embodiment of the present invention. As shown in FIG. 4b, the line detector includes a diode 401, resistors 402~403, a capacitor 404, an amplifier 404a, an NMOS transistor 404b, a comparator 405 and a debounce circuit 406.

The diode 401, the resistors 402~403, the amplifier 404a, the NMOS transistor 404b and the capacitor 404 are used as a peak voltage detector to generate a peak voltage $V_X$ according to L1 or L2. The amplifier 404a has a positive input end, a negative input end and an output end, wherein the positive input end is coupled to an input voltage $V_Y$ which is a function of the voltages on L1, L2, and the formula can be derived with reference to FIG. 4b as follows:

$V_Y$=(voltage on L1 or L2−forward voltage of the diode 401)×resistance of the resistor 403/(resistance of the resistor 402+resistance of the resistor 403). For occasions that components reduction is under consideration, the diode 401 can be replaced with short circuit, and the formula will be: $V_X$=(voltage on L1 or L2)×resistance of the resistor 403/(resistance of the resistor 402+ resistance of the resistor 403). The NMOS transistor 404b has a drain terminal, a source terminal and a gate terminal, wherein the drain terminal is coupled to a supply voltage, the source terminal is coupled to the negative input end of the amplifier 404a, and the gate terminal is coupled to the output end of the amplifier 404a. The capacitor 404 is used as a hold capacitor, having a first plate and a second plate, wherein the first plate is coupled to the source terminal, the second plate is coupled to a ground, and the peak voltage $V_X$ is taken at the first plate. The comparator 405 has a negative comparing input end coupled the peak voltage $V_X$, a positive comparing input end coupled a reference voltage $V_r$, and a comparing output end. The debounce circuit 406 is coupled to the comparing output end for filtering out possible transient glitches to generate the line-off signal $V_{L\_OFF}$.

Once the AC power is plugged off, the input voltage $V_Y$ at the positive input end of the amplifier 404a will be decreasing over time, and the peak voltage $V_X$ at the negative input end of the amplifier 404a will follow the input voltage $V_Y$ due to negative feedback of the amplifier 404a. When $V_X$ falls below a reference voltage $V_r$, the comparing output of the comparator 405 will change state from a low level to a high level. Besides, since the resistors 402~403 will contribute an added power consumption to the adapter, large resistances therefore should be used to minimize the added power consumption.

Figure 5A:
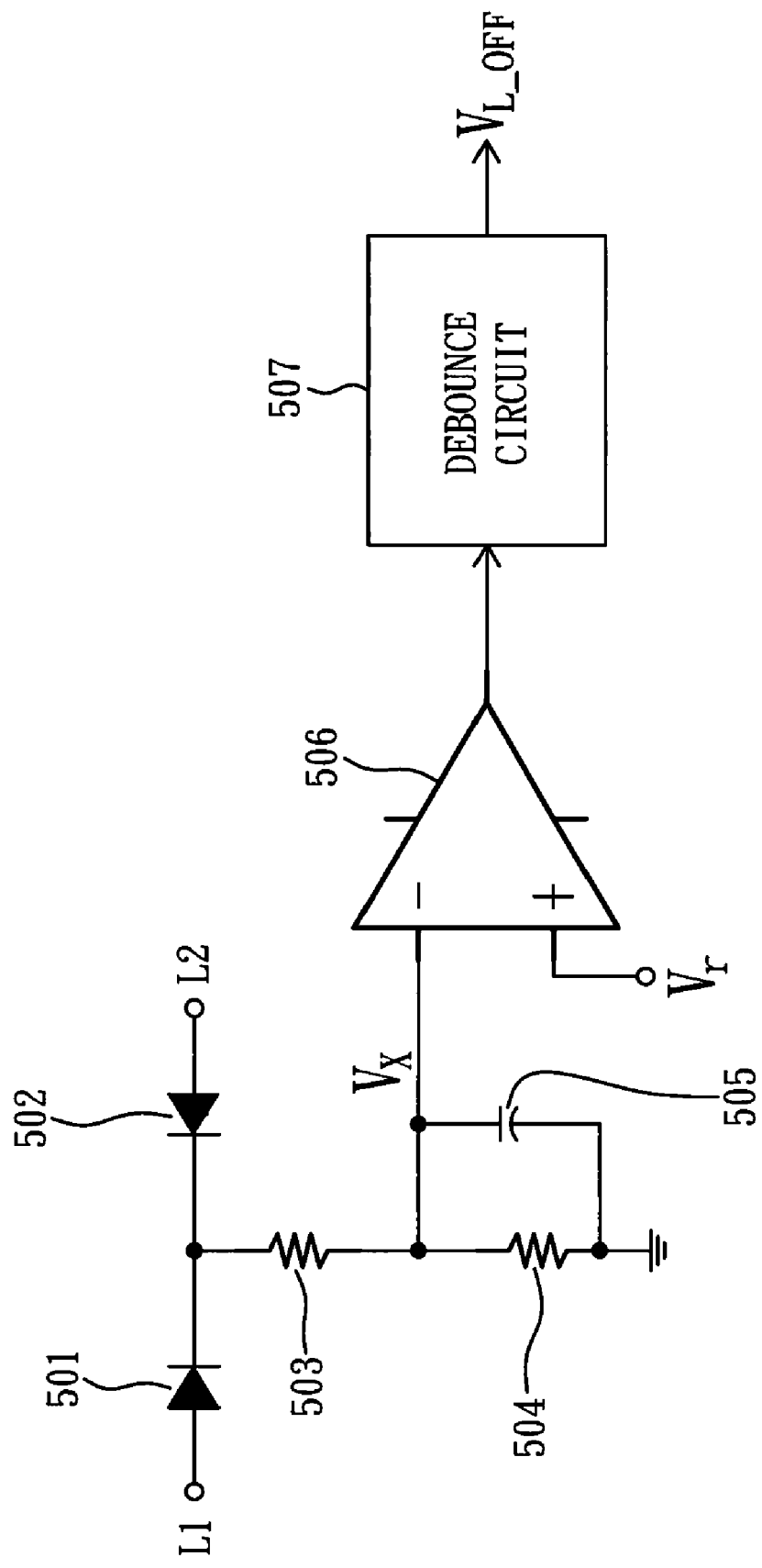
FIG. 5a is the circuit diagram of a line detector according to another preferred embodiment of the present invention.

FIG. 5a shows the circuit diagram of a line detector according to another preferred embodiment of the present invention. As shown in FIG. 5a, the line detector includes diodes 501~502, resistors 503~504, a capacitor 505, a comparator 506 and a debounce circuit 507.

The diodes 501-502, the resistors 503~504 and the capacitor 505 are used as a peak voltage detector to generate a peak voltage $V_X$ according to L1 and L2, and the formula can be derived with reference to FIG. 5a as follows:

$V_X$=(the higher one of voltages on L1 and L2−forward voltage of the diode 501 or 502)×resistance of the resistor 504/(resistance of the resistor 503+resistance of the resistor 504). Once the AC power is plugged off, the peak voltage $V_X$ will be decreasing over time, and when $V_X$ falls below a reference voltage $V_r$, the output of the comparator 506 will change state from a low level to a high level. Since the resistors 503~504 will contribute an added power consumption to the adapter, large resistances therefore should be used to minimize the added power consumption. The debounce circuit 507 is coupled to the output of the comparator 506 for filtering out possible transient glitches to generate the line-off signal $V_{L\_OFF}$.

Figure 5B:
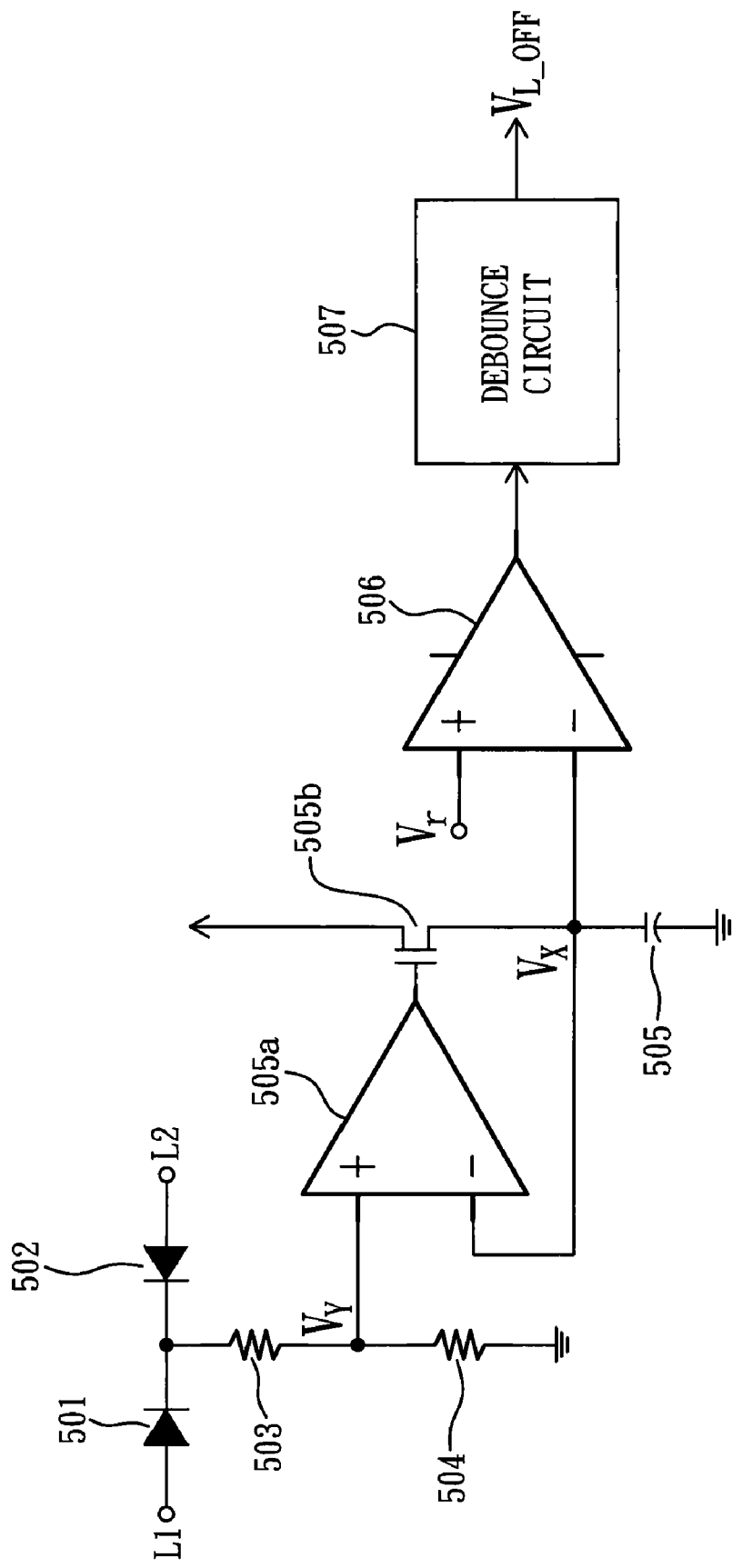
FIG. 5b is the circuit diagram of a line detector according to still another preferred embodiment of the present invention.

Please refer to FIG. 5b, which shows the circuit diagram of a line detector according to another preferred embodiment of the present invention. As shown in FIG. 5b, the line detector includes diodes 501~502, resistors 503~504, a capacitor 505, an amplifier 505a, an NMOS transistor 505b, a comparator 506 and a debounce circuit 507.

The diodes 501~502, the resistors 503~504, the amplifier 505a, the NMOS transistor 505b and the capacitor 505 are used as a peak voltage detector to generate a peak voltage $V_X$ according to L1 and L2. The amplifier 505a has a positive input end, a negative input end and an output end, wherein the positive input end is coupled to an input voltage $V_Y$ which is a function of the voltages on L1, L2, and the formula can be derived with reference to FIG. 5b as follows:

$V_Y$=(the higher one of voltages on L1 and L2−forward voltage of the diode 501 or 502)×resistance of the resistor 504/(resistance of the resistor 503+resistance of the resistor 504). The NMOS transistor 505b has a drain terminal, a source terminal and a gate terminal, wherein the drain terminal is coupled to a supply voltage, the source terminal is coupled to the negative input end of the amplifier 505a, and the gate terminal is coupled to the output end of the amplifier 505a. The capacitor 505 is used as a hold capacitor, having a first plate and a second plate, wherein the first plate is coupled to the source terminal, the second plate is coupled to a ground, and the peak voltage $V_X$ is taken at the first plate. The comparator 506 has a negative comparing input end coupled the peak voltage $V_X$, a positive comparing input end coupled a reference voltage $V_r$, and a comparing output end. The debounce circuit 507 is coupled to the comparing output end for filtering out possible transient glitches to generate the line-off signal $V_{L\_OFF}$.

Once the AC power is plugged off, the input voltage $V_Y$ at the positive input end of the amplifier 505a will be decreasing over time, and the peak voltage $V_X$ at the negative input end of the amplifier 505a will follow the input voltage $V_Y$ due to negative feedback of the amplifier 505a. When $V_X$ falls below a reference voltage $V_r$, the comparing output of the comparator 506 will change state from a low level to a high level. Besides, since the resistors 503~504 will contribute an added power consumption to the adapter, large resistances therefore should be used to minimize the added power consumption.

Figure 6:
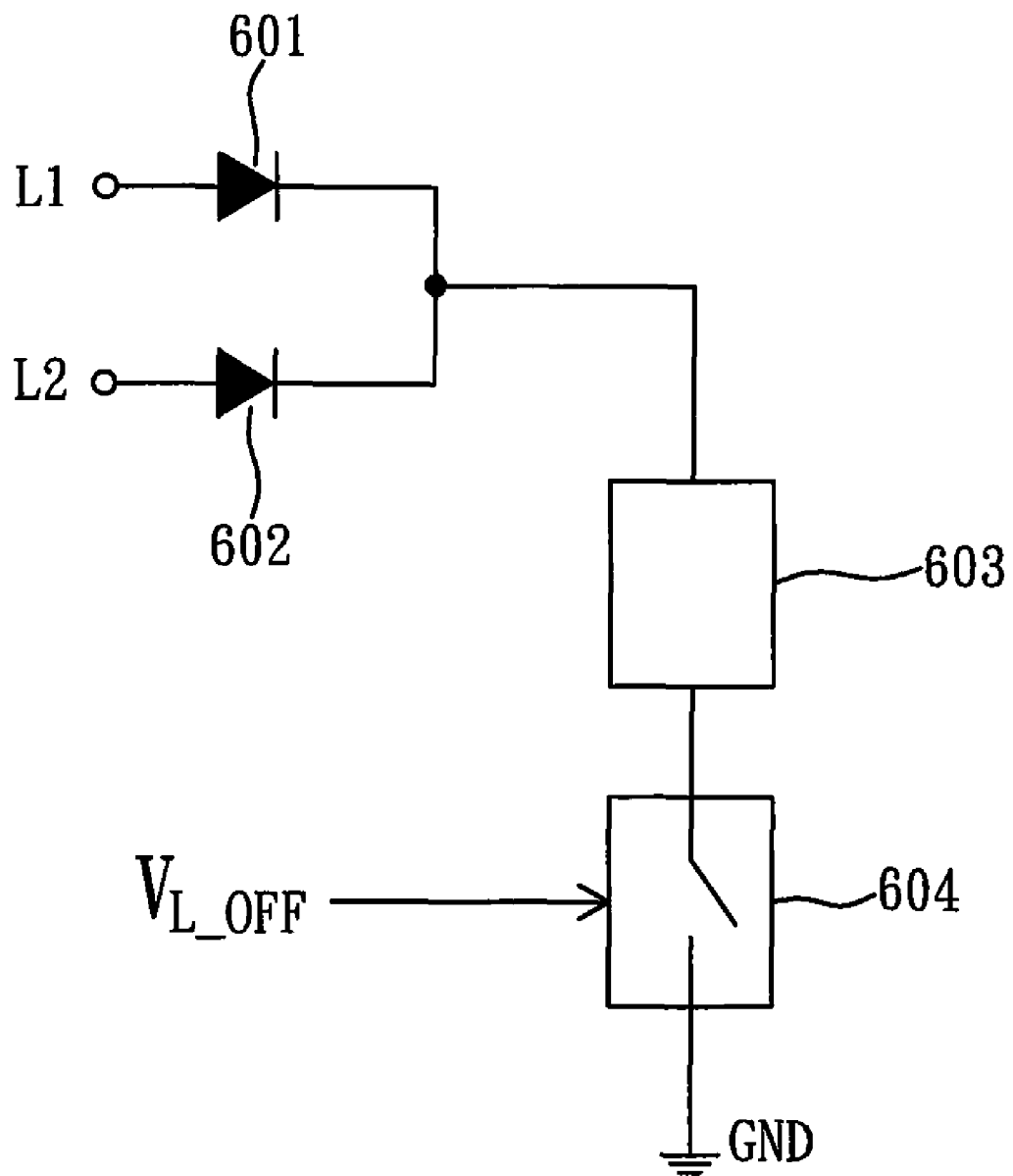
FIG. 6 is the circuit diagram of a discharging circuit according to a preferred embodiment of the present invention.

Please refer to FIG. 6, which shows the circuit diagram of a discharging circuit according to a preferred embodiment of the present invention. As shown in FIG. 6, the discharging circuit includes diodes 601~602, a resistive load 603 and a switch 604.

The anode of the diode 601 is coupled to L1 and the anode of the diode 602 is coupled to L2 so that the diode 601 will be conducted and the diode 602 will be off if the voltage on L1 is positive and the voltage on L2 is negative when the AC power is plugged off, and the diode 601 will be off and the diode 602 will be conducted if the voltage on L1 is negative and the voltage on L2 is positive when the AC power is plugged off. Thus, when $V_{L\_OFF}$ is at a high level, the switch 604 will be switched on, there will be a current flowing through the resistive load 603 to discharge the safety capacitor, and the discharge path has two possibilities: L1→the diode 601→the resistive load 603→the switch 604→GND→diode 203(or 303)→L2 with (voltage on L1, voltage on L2) being (positive, negative), and L2→the diode 602→the resistive load 603→the switch 604→GND→diode 202(or 302)→L1 with (voltage on L1, voltage on L2) being (negative, positive). Although the resistive load 603 is atop the switch 604 in FIG. 6, actually it can also be put between the switch 604 and the reference ground GND, and if further cost reduction is demanded, it can be implemented with short circuit. Besides, the diodes 601~602 can be replaced with the diodes 501~502, i.e. the line detector in FIG. 5 and the discharging circuit in FIG. 6 can share a common pair of diodes.

Figure 7:
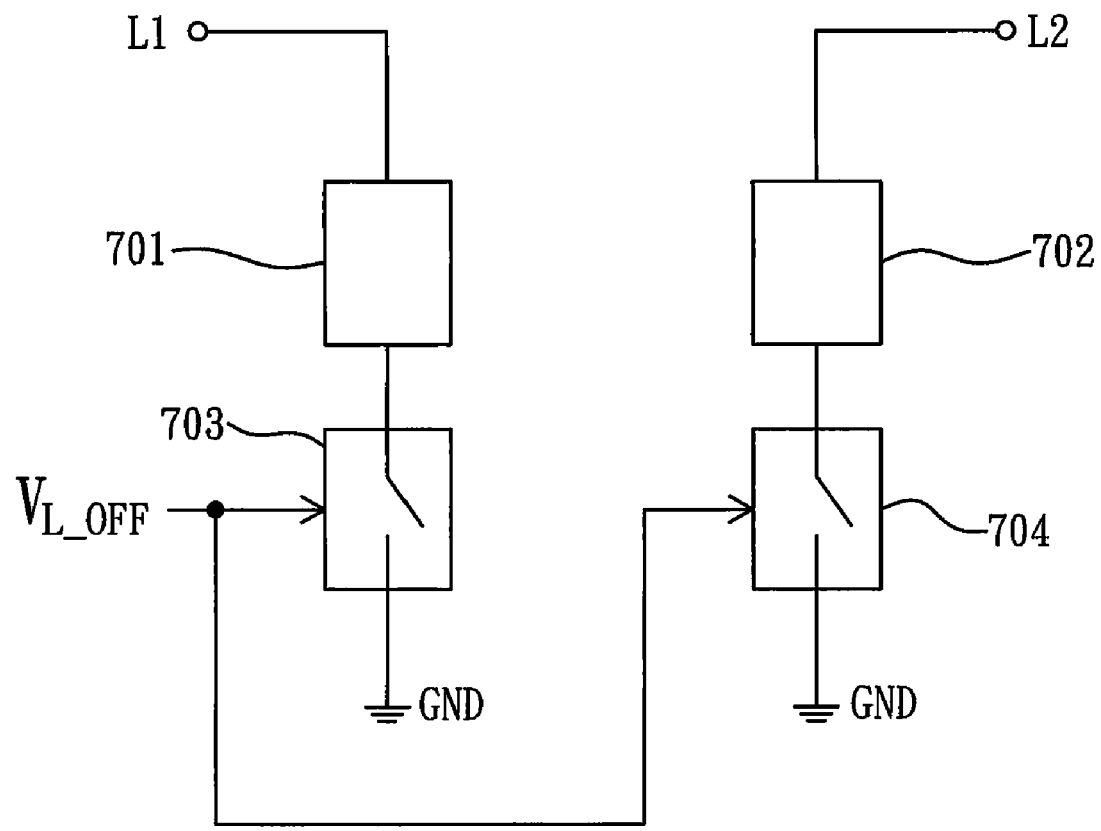
FIG. 7 is the circuit diagram of a discharging circuit according to another preferred embodiment of the present invention.

FIG. 7 shows the circuit diagram of a discharging circuit according to another preferred embodiment of the present invention. As shown in FIG. 7, the discharging circuit includes a pair of resistive loads 701~702 and a pair of switches 703~704.

The resistive load 701 and the switch 703 are placed between the line voltage L1 and the reference ground GND, while the resistive load 702 and the switch 704 are placed between the line voltage L2 and the reference ground GND. When $V_{L\_OFF}$ is at a high level, the switches 703~704 will be switched on, there will be a current flowing through the resistive loads 701,702 to discharge the safety capacitor, and the discharge path has two possibilities: L1→the resistive load 701→the switch 703→GND→the switch 704→the resistive load 702→L2 with (voltage on L1, voltage on L2) being (positive, negative), and L2→the resistive load 702→the switch 704→GND→the switch 703→the resistive load 701→L1 with (voltage on L1, voltage on L2) being (negative, positive). Although the pair of resistive loads 701~702 is atop the pair of switches 703~704 in FIG. 7, actually it can also be put between the pair of switches 703~704 and the reference ground GND. Besides, the resistive load 701 or the resistive load 702 or both of them can be implemented with short circuit if further cost reduction is demanded.

Figure 8:
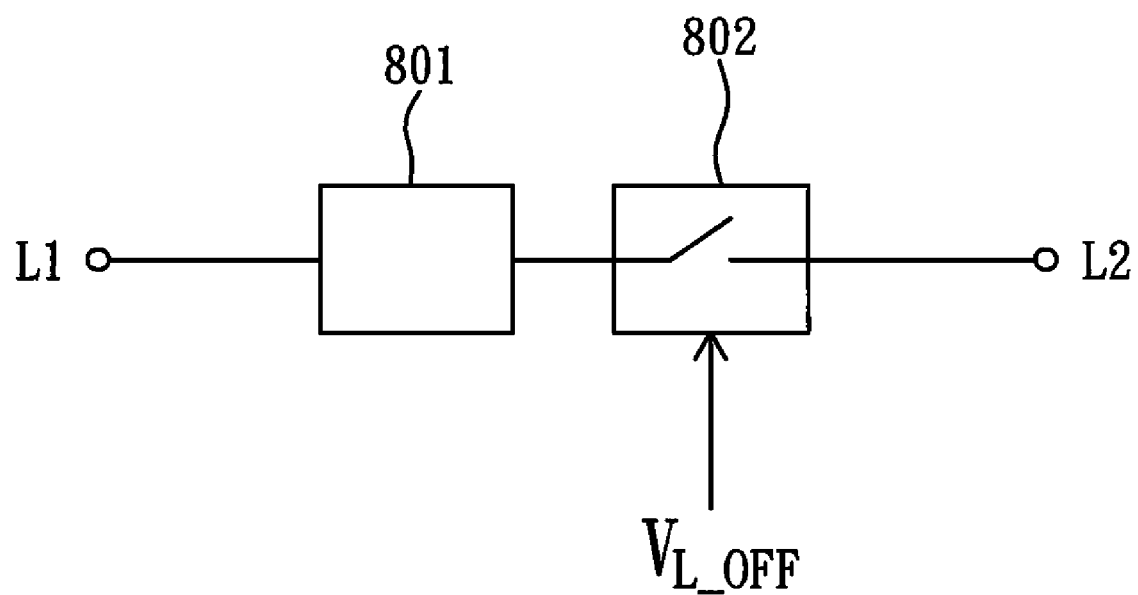
FIG. 8 is the circuit diagram of a discharging circuit according to still another preferred embodiment of the present invention.

FIG. 8 shows the circuit diagram of a discharging circuit according to still another preferred embodiment of the present invention. As shown in FIG. 8, the discharging circuit includes a resistive load 801 and a switch 802.

The resistive load 801 and the switch 802 are placed between the line voltage L1 and the line voltage L2. When $V_{L\_OFF}$ is at a high level, the switch 802 will be switched on, there will be a current flowing through the resistive load 801 to discharge the safety capacitor, and the discharge path has two possibilities: L1->the resistive load 801→the switch 802→L2 with (voltage on L1, voltage on L2) being (positive, negative), and L2→the switch 802→the resistive load 801→L1 with (voltage on L1, voltage on L2) being (negative, positive). Although the resistive load 801 is placed at the left side of the switch 802 in FIG. 8, actually it can also be put at the right side of the switch 802, and if further cost reduction is demanded, it can be implemented with short circuit.

Figure 9:
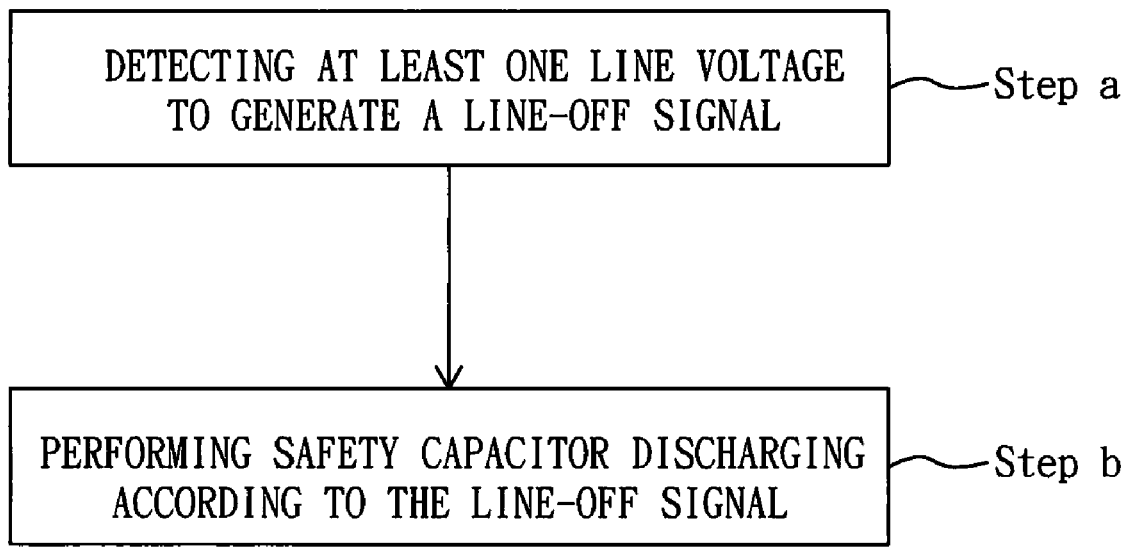
FIG. 9 is the flow chart of a safety capacitor discharging method for an AC-to-DC power application according to a preferred embodiment of the present invention.

According to the circuits disclosed above, the present invention further proposes a safety capacitor discharging method. Please refer to FIG. 9, which shows the flow chart of a safety capacitor discharging method for an AC-to-DC power application according to a preferred embodiment of the present invention. As shown in FIG. 9, the flow chart includes detecting at least one line voltage to generate a line-off signal (step a) and performing safety capacitor discharging according to the line-off signal (step b).

In step a, the line-off signal has a first state, for example a low level, and a second state, for example a high level. When the peak voltage of the at least one line voltage falls below a reference voltage, the line-off signal will change state form the first state to the second state. To filter out possible glitches in the line-off signal, a voltage debouncing process can be further included in this step.

In step b, a discharging path for a safety capacitor is formed according to the line—off signal, wherein the discharge of the safety capacitor is performed by generating a conduction path between two line voltages when the line-off signal is at the second state.

Through the implementation of the present invention, a more power saving performance in standby mode for AC-to-DC converters complying with the safety regulation is achieved. The proposed novel scheme features a concise structure and can meet both the safety regulation and the green regulation.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A safety capacitor discharging apparatus for AC-to-DC converters, wherein the AC-to-DC converters have a safety capacitor connected between two line voltages, the apparatus comprising:

a line detector, used for detecting at least one line voltage to generate a line-off signal, wherein the line-off signal is at a first state when a peak voltage of the at least one line voltage is above a reference voltage, and the line-off signal is at a second state when the peak voltage of the at least one line voltage is below the reference voltage; and a discharging circuit, used for discharging the safety capacitor by generating a conduction path between two plates of the safety capacitor when the line-off signal is at the second state, the line detector comprising:

a peak voltage detector, coupled to at least one of the two line voltages to generate the peak voltage; and a comparator, having a first negative input coupled to the peak voltage, a first positive input coupled to the reference voltage, and a first output for generating the line-off signal, wherein the line-off signal is at the second state when the peak voltage is below the reference voltage.

2. The apparatus according to claim 1, wherein the peak voltage detector comprises:

an amplifier, having a second positive input end, a second negative input end and a second output end, wherein the second positive input end is coupled to an input voltage which is a function of the two line voltages;

a transistor, having a first terminal, a second terminal and a control terminal, wherein the first terminal is coupled to a supply voltage, the second terminal is coupled to the second negative input end, and the control terminal is coupled to the second output end; and a hold capacitor, having a first plate and a second plate, wherein the first plate is coupled to the second terminal, the second plate is coupled to a ground, and the peak voltage is taken at the first plate.

3. The apparatus according to claim 1, wherein the line detector further comprises a debounce circuit coupled to the comparator to generate the line-off signal.

4. The apparatus according to claim 1, wherein the discharging circuit comprises:
- a pair of unilateral switches, having a pair of anodes coupled to the two line voltages, and a common cathode; and
- a load circuit, coupled between the common cathode and a ground, and controlled by the line-off signal, wherein the load circuit exhibits a first impedance when the line-off signal is at the first state; the load circuit exhibits a second impedance when the line-off signal is at the second state; and the first impedance is greater than the second impedance.

5. The apparatus according to claim 1, wherein the discharging circuit comprises a pair of load circuits, which have a common contact coupled to a ground, and a pair of contacts coupled to the two line voltages, and are controlled by the line-off signal, wherein the pair of load circuits exhibits a first impedance when the line-off signal is at the first state; the pair of load circuits exhibits a second impedance when the line-off signal is at the second state; and the first impedance is greater than the second impedance.

6. The apparatus according to claim 1, wherein the discharging circuit comprises a load circuit, which is coupled between the two line voltages, and controlled by the line-off signal, wherein the load circuit exhibits a first impedance when the line-off signal is at the first state; the load circuit exhibits a second impedance when the line-off signal is at the second state; and the first impedance is greater than the second impedance.

* * * * *